F. G. BALDWIN.
ROLLING MILITARY KITCHEN.
APPLICATION FILED APR. 19, 1917.
1,328,071.
Patented Jan. 13, 1920.
2 SHEETS—SHEET 1.
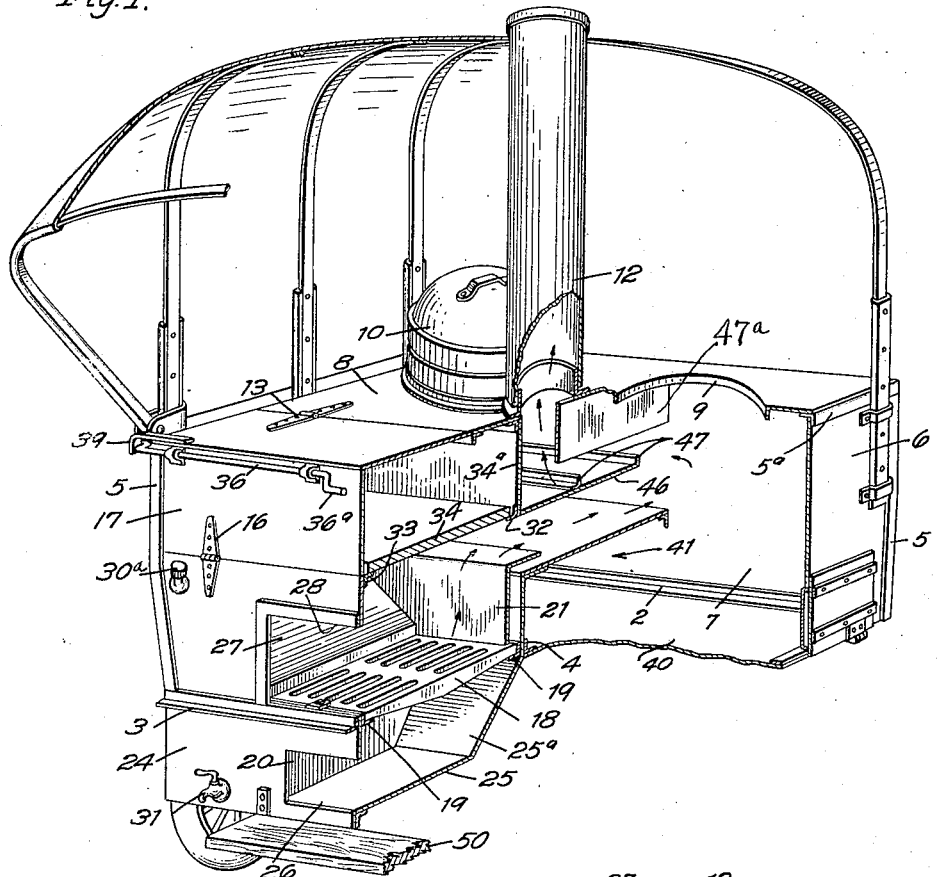

F. G. BALDWIN.
ROLLING MILITARY KITCHEN.
APPLICATION FILED APR. 19, 1917.
1,328,071.
Patented Jan. 13, 1920.
2 SHEETS—SHEET 2.
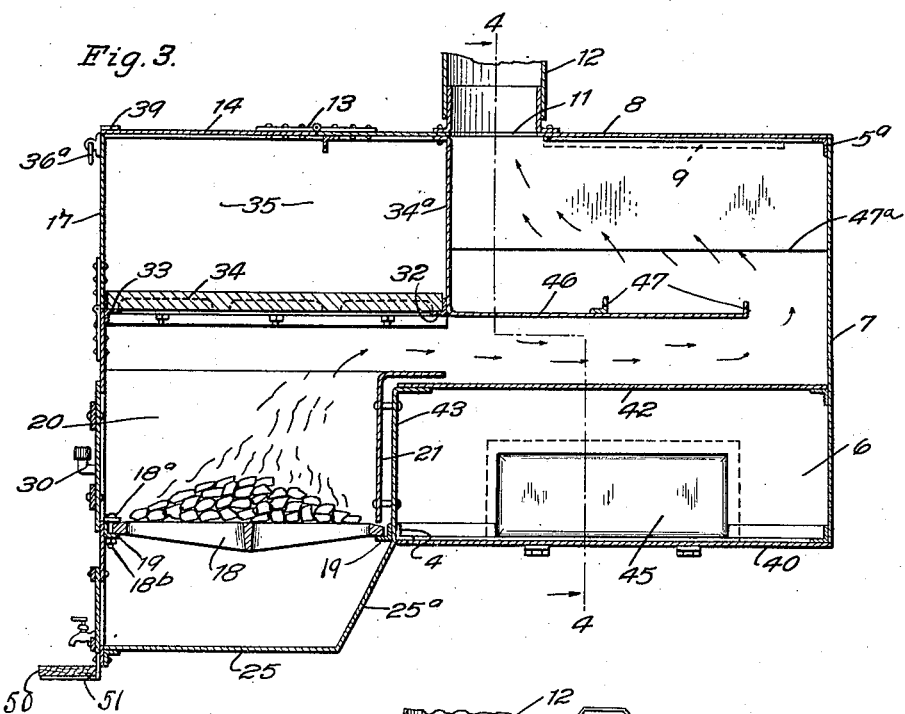
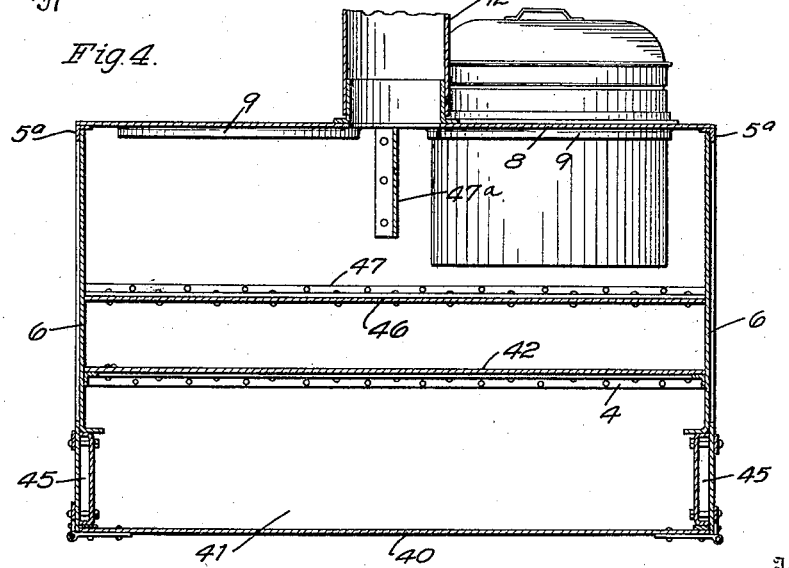
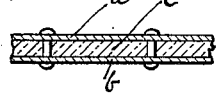

UNITED STATES PATENT OFFICE.

FRANK G. BALDWIN, OF CINCINNATI, OHIO, ASSIGNOR TO THE SECHLER & COMPANY, OF CINCINNATI, OHIO, A CORPORATION OF OHIO.

ROLLING MILITARY KITCHEN.

1,328,071.   Specification of Letters Patent.   Patented Jan. 13, 1920.

Application filed April 19, 1917. Serial No. 163,292.

*To all whom it may concern:*

Be it known that I, FRANK G. BALDWIN, a citizen of the United States, and a resident of the city of Cincinnati, in the county of Hamilton and State of Ohio, have invented certain new and useful Improvements in Rolling Military Kitchens, of which the following is a full, clear, and exact description, reference being had to the accompanying drawings, forming part of this specification.

My invention relates to army field kitchens particularly of the type which can be readily mounted on a wheeled vehicle and moved from place to place. In the field kitchens of the art, there have been various arrangements of the necessary cooking devices so as to accomplish as much as possible in the field with as little load to carry from place to place.

It is the object of this invention to provide a new and convenient arrangement of the cooking devices so that the fullest efficiency can be had in all operations and so that the greatest convenience of operation can be attained. It is desired that every space be utilized for some one of the necessary cooking operations and the purpose is to arrange for the placing and distribution of ovens, warmers, water heaters, cooking vessels, fire box, chimney and the other requisite parts of a kitchen so that the whole may be easily moved from place to place and operated efficiently and quickly.

One of the objects is to provide containing spaces for carrying water without occupying extra space or unduly complicating the structure. Another object is to completely insulate, if desired, the entire structure.

The objects above noted are accomplished by that certain construction and arrangement of parts to be hereinafter more specifically pointed out and claimed.

In the drawings,

Figure 1 is a perspective view of the device with one side broken away to show the interior details.

Fig. 2 is a rear elevation broken away on one side.

Fig. 3 is a central longitudinal section of the device.

Fig. 4 is a vertical section on the line 4, 4, of Fig. 3.

Fig. 5 is a detail of the insulation.

The framework of the device is made up of angle iron bars, preferably there being side bars 1, 1, and end bars 2 and 3 at the front and rear. Across the center of the device is a like bar 4, and at the corners running upwardly are further like bars 5, connected at the sides and front by bars $5^a$. The various parts of the shell of the device consist in metal plates which are suitably riveted to the above mentioned framework or built up in a suitable manner therefrom on similar angle plates or bars. All of these plates are preferably made up of two sheets of steel $a$ and $b$, suitably riveted together and the space between them filled with heat insulating material $c$ (Fig. 5). This structure is not shown in the assembly views for purpose of clearness and simplicity. Thus there are the side plates 6, 6, extending up from each side of the frame, and a front end plate 7, closing the shell at the front. Near the front of the device there is a top shell 8 which has flanged apertures 9, 9, spaced apart, one at each side for large vessels 10, and a central aperture 11 for the smoke stack 12.

Hinged at 13, 13, to the plate or plates 7 is the cover 14 which is adapted to be raised for a purpose to be described. It is not necessary to provide hinges for this cover 14, as in practical use it is rarely if ever raised. At the rear of the frame, and extending only part way up to the top of the shell is the rear plate 15. A like cover to the lid 14 is hinged at 16 to this vertical rear plate, this cover being indicated at 17. The covers 14 and 17, which may be in one or more parts as desired, are adapted to butt against each other at the ends, and serve to give access to the same compartment, *i. e.* the cooking compartment, which will be hereinafter described.

The grate bars 18 for the fire pot are mounted at the central portion of the rear of the frame on angle plates 19 secured to the rear and central bars. Small plates $18^a$ are provided which with bolts $18^b$ which fasten the angle iron 19, serve as clips to hold the grate from jumping about and breaking during transportation. At each side of the grate bars are secured the plates 20 which slope away laterally from the grate bars and thence downwardly below the grate so as to form the sides of the ash box for said grate. At the forward end of the grate bars a plate 21 is mounted, which extends clear to the sides of the frame, and extends up to the height of the side plates 20, thereby forming the forward walls of a water compartment 22 at each side of the grate. This plate 21 is located slightly above the cross iron 19 so as to form a pocket to hold the grate bars down at the front. The clips above mentioned will need to be used at the rear only. The top and inside walls of the water compartments 22 are formed by the two sloping plates 20. The rear plate 15 of the shell forms part of the rear walls of the water compartments, the side shell of the device forms the outside walls in part of the water compartments, and to complete them there depend from each side of the frame at the rear the plates 23, 23, forming the balance of the outside of the compartments, a rear plate 24 depending from the rear frame bar, which forms the balance of the rear wall of the compartments, and a bottom plate 25 which extends clear across the device which forms the base of the compartments. Plates 27 face the sloping walls 20 in my preferred construction.

The rear plate 24 is cut away at 26 for an ash door $26^a$, and the bottom plate forms the base of the ash chamber. This bottom plate is shown as being in two parts with the rear part $25^a$ extending or sloping upward thereby forming a sloping bottom for the ash pit and the two water compartments at each side.

It can be seen that this structure combines in a convenient way the necessary plates for forming the ash pit and fire box and two water compartments. These compartments will be kept boiling when the fire is going and thus they will serve for water carriers when the device is not in use and will supply boiling water for speeding up the cooking as soon as a fire is started up on the grate. The sloping walls for the fire box also permit the products of combustion to spread out clear across the shell where it can be available throughout the device. A door space 28 is cut in the main rear shell of the device and a door 29 to the fire box is mounted over this opening. Suitable filling pipes 30, 30, are set into the water compartments, the same having caps $30^a$ which could be supplied with suitable check valves to permit escape of the steam. There are also suitable spigots or faucets 31, 31. Over the top of the fire box are extended irons 32, 33, on which are set some sort of slow heat conducting pan or shelf 34, which, with a vertical wall $34^a$ extending down to the forward bar 33, forms with the two large lids at the rear of the device a compartment 35 for the main purpose of cooking. The shelf 34 is formed in the structure shown in three sections of heavy ribbed iron. There are cross irons $34^1$ extending between the bars 32 and 33. The plates are cut to leave a flange at $34^2$, and an iron bar $34^3$ fits along the cut space of two adjacent sections. This iron 34 bolts to the cross angle iron $34^1$, and holds the sections together and also prevents the unseating of them by any jarring of the vehicle.

A suitable locking bar 36 is pivoted at 37, 37, to the rear hinged member 17, and has cranks 38 at the end which engage in front of plates 39 at the top corners of the shell. To release the lock bar, the crank portion $36^a$, at the middle thereof, is raised, which will lower the cranks 38 from their locking position. This is not, of course, the only method of holding the swinging lid or door locked shut, and is shown for purpose of illustration of the device.

Across the bottom of the device extending forward from the grate bar level is the bottom plate 40 of the bake oven 41. The front of the bake oven is formed by the front plate of the shell of the device. The top of the oven is a plate 42 extending across the entire space, and the rear plate of the oven is formed by a plate 43 which extends up alongside of the rear plate of the fire box, leaving a space between the oven and the said rear plate. The sides of the shell form the sides of the oven, and there are door openings $x$ $x$ cut in each of the side shells for the oven, the same being fitted with suitable doors 45. The products of combustion from the fire box pass over the top of the oven all the way across and to confine the path of the same and carry it forward over the entire top of the oven; there is mounted across the shell a baffle plate 46, which has several small battens or stiffeners 47 on the top thereof. The smoke stack hole is located over this baffle 46 and extending down from the top of the shell above said plate is a partition or baffle $47^a$ which divides the upper portion of the space formed by the said baffle 46 into two compartments also dividing the smoke stack hole.

The products of combustion, after passing over the oven to the front of the device, thence past the baffle 46, are divided by the partition and pass by the kettles on their way to the stack. The bake oven extends clear across the device and has doors at each side. When not baking, this oven may be used as a warming oven and a storage place for pans and the like when the stove is not in use. The fire is easily available from the rear, and the water compartments form a cooled side wall for the fire box, while at the same time providing hot water for the cooking. Furthermore these water compartments are formed by merely extending the plates and bars requisite for making up the fire pot and ash pit, so as to square up the shell of the device and thus involve but little extra expense. The sloping walls for the fire box allow the heat to spread out to the width of the cooking compartment, ovens and vessel supports, and to do a great deal more cooking in a given time than in the devices of the past. This is a very valuable feature as in baking bread for a large number of men, a great deal of space is required, and it can be done in the bake oven while the rest of the cooking is going on. The two large vessels at the sides of the smoke stack may be used for coffee and stew or hot water. This space is easily available from the rear or from the top.

Although no particular method has been described, it is evident that the base frame of the device could easily be mounted on a wheeled vehicle, or the frame itself made the chassis of such vehicle. The construction is very stout, and capable of fast travel over rough ground without coming to pieces, as is likely to be the case with the rolling military kitchens with which I am acquainted. One of the main purposes of the construction is to provide a field kitchen which may be drawn rapidly as a trailer vehicle to an automobile, thereby providing a field kitchen which can be caused to move with the speed of an automobile instead of creeping along, as in the present field kitchens with which I am acquainted.

It will be noted that the device is built up and hung from a rectangular angle iron framework, and that the side, bottom and end plates secured to these irons all form parts of the various structures included in the kitchen. Also practically all of the space inside of the rectangular shell is available for cooking or heating which is not taken up by the necessary firebox and ash pit.

At the rear of the vehicle may be placed a step 50 which is merely supported in some desired manner on angle plates 51. This will enable the cook to stand on the step to attend to his fires and cooking while the vehicle is being moved from place to place.

The details of the above description may be modified in various ways, and it is not my desire that the claims that follow be limited beyond the plain meaning of their words because of the failure to point out such modified structures as might be substituted in the device without departing from the spirit of the invention therein.

Having thus described my invention, what I claim as new and desire to secure by Letters Patent, is:—

1. In a rolling military kitchen, the combination of a substantially rectangular frame and shell, with the interior of the shell at the rear divided into a fire box, two water compartments and a cooker above the fire box and the interior of the shell at the front divided into a single oven transverse the shell, a plurality of supports for vessels for cooking, a flue for the escape of products of combustion, and a baffle to cause the products of combustion to travel over the top of the oven before reaching the cooking vessels.

2. In a rolling military kitchen, a framework and casing therefor, a fire box available from the rear of the vehicle and located within the casing with flaring side walls extending to the sides of the casing, a single oven extending across the vehicle and located forwardly from the fire box with the front, sides and base of the casing forming three of the sides and the base of the oven, and the fire box having an opening extending across the entire width of the oven for causing the products of combustion from the fire box to pass over the top of the oven to the front of the casing of the device, a flue in said casing located centrally thereof, and cooking vessels located in the top of the casing between the front thereof and the flue.

FRANK G. BALDWIN.